United States Patent
Lundgard et al.

(10) Patent No.: US 9,856,369 B2
(45) Date of Patent: Jan. 2, 2018

(54) LARGE PARTICLE ORGANIC EXTENDER

(71) Applicants: Dow Global Technologies LLC, Midland, MI (US); Rohm and Haas Company, Philadelphia, PA (US)

(72) Inventors: Richard A. Lundgard, Midland, MI (US); Partha S. Majumdar, Harleysville, PA (US); David L. Malotky, Midland, MI (US); Jodi M. Mecca, Midland, MI (US); Edwin Nungesser, Horsham, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 227 days.

(21) Appl. No.: 14/949,146

(22) Filed: Nov. 23, 2015

(65) Prior Publication Data

US 2016/0160016 A1   Jun. 9, 2016

Related U.S. Application Data

(60) Provisional application No. 62/087,840, filed on Dec. 5, 2014.

(51) Int. Cl.
| | |
|---|---|
| *C08K 7/16* | (2006.01) |
| *C08L 23/06* | (2006.01) |
| *C09D 5/00* | (2006.01) |
| *C08K 3/22* | (2006.01) |
| *C09D 123/06* | (2006.01) |

(52) U.S. Cl.
CPC ............... *C08L 23/06* (2013.01); *C08K 3/22* (2013.01); *C09D 5/00* (2013.01); *C09D 123/06* (2013.01); *C08K 2003/2241* (2013.01)

(58) Field of Classification Search
CPC .. C09D 143/02; C09D 133/06; C09D 133/04; C08F 220/10
See application file for complete search history.

(56) References Cited

U.S. PATENT DOCUMENTS

| | | | |
|---|---|---|---|
| 4,970,258 A | 11/1990 | Homma et al. | |
| 6,204,310 B1 | 3/2001 | Choudhery | |
| 6,649,687 B1 | 11/2003 | Gheewala et al. | |
| 7,829,626 B2 | 11/2010 | Chiou et al. | |
| 8,779,053 B2 | 7/2014 | Lundgard et al. | |
| 2002/0074681 A1 | 6/2002 | Lundgard et al. | |
| 2004/0034158 A1 | 2/2004 | Reuter et al. | |
| 2007/0292677 A1 | 12/2007 | Kayima et al. | |
| 2010/0143837 A1* | 6/2010 | Klier | G03G 9/0806 430/114 |
| 2012/0125801 A1 | 5/2012 | Kainz et al. | |
| 2012/0238681 A1 | 9/2012 | Neubauer et al. | |
| 2013/0052454 A1 | 2/2013 | Donovan et al. | |
| 2015/0337140 A1* | 11/2015 | Romick | C09D 5/08 428/413 |
| 2015/0344718 A1 | 12/2015 | Lundgard et al. | |
| 2016/0280951 A1* | 9/2016 | Drumright | C09D 123/10 |
| 2017/0210933 A1* | 7/2017 | Bohling | C09D 133/06 |

* cited by examiner

*Primary Examiner* — Hannah Pak
(74) *Attorney, Agent, or Firm* — Reid S. Willis

(57) ABSTRACT

The present invention relates to a composition comprising an aqueous dispersion of spheroidal particles having a mode particle size of from 10 to 30 μm. The spheroidal particles are useful as organic extenders, especially in below-critical pigmented coatings formulations, and provide coatings with improved stain removal properties.

10 Claims, No Drawings

LARGE PARTICLE ORGANIC EXTENDER

BACKGROUND OF THE INVENTION

The present invention relates to a composition comprising an aqueous dispersion of large spheroidal polyolefin particles, which are useful as a substitute for inorganic extenders, especially for below-critical PVC coating compositions.

Architectural coatings with low pigment volume concentration (PVC)—typically semi-gloss and gloss paints—show better durability and resistance performances compared to high PVC coatings. High gloss paints comprise mostly polymeric binder and pigment. Inorganic extenders such as calcium carbonate, clay, and silica are often included to reduce sheen of the coating and also to reduce the cost of the coating formulation; nevertheless, the physical performance of the coating is adversely impacted with extender usage; thus a significant amount of formulation adjustment is required to achieve the desired cost-performance balance of the final paint product. For example, inorganic extenders tend to increase the difficulty of removing stains from coated surfaces without damaging the paint. It would therefore be an advance in the art of below-critical PVC coating compositions to find an alternative to inorganic extenders that will give coatings with improved stain removal properties.

SUMMARY OF THE INVENTION

In a first aspect, the present invention is a composition comprising an aqueous dispersion of spheroidal particles having a mode particle size of from 10 to 30 μm, wherein the particles comprise a) from 53 to 85 weight percent of a polyolefin; and b) from 5 to 40 weight percent of a coupling agent which is a maleic anhydride functionalized polyolefin having an acid number in the range of from 35 to 220, wherein the weight percentages are based on the total weight of the polyolefin and the coupling agent; with the proviso that when the coupling agent has an acid number of less than 100, the composition further comprises from 9 to 35 weight percent of an ethylene-acrylic acid copolymer, based on the total weight of the polyolefin, the coupling agent, and the ethylene-acrylic acid copolymer, wherein the ethylene-acrylic acid copolymer has an acid number in the range of from 20 to 220. The composition of the present invention is useful as an organic extender for pigmented coating formulations, especially below-critical PVC pigmented coating formulations, and provide coatings with improved stain removal properties.

DETAILED DESCRIPTION OF THE INVENTION

In a first aspect, the present invention is a composition comprising an aqueous dispersion of spheroidal particles having a mode particle size of from 10 to 30 μm, wherein the particles comprise a) from 53 to 85 weight percent of a polyolefin; and b) from 5 to 40 weight percent of a coupling agent which is a maleic anhydride functionalized polyolefin having an acid number in the range of from 35 to 220, wherein the weight percentages are based on the total weight of the polyolefin and the coupling agent; with the proviso that when the coupling agent has an acid number of less than 100, the composition further comprises from 9 to 35 weight percent of an ethylene-acrylic acid copolymer, based on the total weight of the polyolefin, the coupling agent, and the ethylene-acrylic acid copolymer, wherein the ethylene-acrylic acid copolymer has an acid number in the range of from 20 to 220.

Examples of suitable polyolefins include polyethylene, polypropylene, copolymers of polyethylene, copolymers of polypropylene, and ethylene-vinyl acetate copolymers, and combinations thereof. Other suitable examples of polyolefins are those disclosed in U.S. Pat. No. 8,779,053 B2, columns 3 and 4. Examples of preferred polyolefins include a high density polyethylene (HDPE) and polypropylene (PP). The preferred concentration of the polyolefin in the spheroidal particles (also referred to herein as organic extender particles or organic extender) is from 57, more preferably from 60 weight percent, to 78 and more preferably to 75 weight percent, based on the weight of the polyolefin, the ethylene-acrylic copolymer, and the coupling agent. Preferably, the mode particle size of the spheroidal particles is from 12 to 25 μm. As used herein, "mode particle size" refers to the mode particles size as measured by a Malvern Mastersizer 2000 Analyzer.

The coupling agent preferably has an acid number in the range of 40 to 99, more preferably to 90. The preferred concentration of the coupling agent is from 5 more preferably from 7, to 30, more preferably to 12, and more preferably to 11 weight percent, based on the weight of the polyolefin, the ethylene-acrylic copolymer, and the coupling agent. Examples of suitable coupling agents include LICOLUB CE-2 wax (acid number ~85), LICOCENE PP MA 6452 wax (acid number ~41), PA 18 polyanhydride resin (acid number ~212).

In the preferred and more preferred coupling agent acid number range, the composition further comprises from 9, preferably from 15, to 35, preferably to 32 weight percent of an ethylene-acrylic acid copolymer based on the total weight of the polyolefin, the ethylene acrylic acid copolymer, and the coupling agent. As used herein, the term "ethylene-acrylic acid copolymer" refers to the copolymer or salts thereof or combinations thereof.

The ethylene-acrylic acid copolymer has an acid number in the range of from 20, preferably from 120, more preferably from 140 to preferably 200, more preferably to 180. Acid number is measured using ASTM D-1386 and the stated number refers to the amount in milligrams of KOH per gram of polymer required to neutralize acid functionality of the ethylene-acrylic acid copolymer and the coupling agent when measured by titration. An example of a commercially available ethylene-acrylic acid copolymer is PRIMACOR™ 5980i Copolymer (A Trademark of The Dow Chemical Company and its Affiliates). It is understood that the maleic anhydride functionality in the final composition may be partially or completely hydrolyzed, or non-hydrolyzed, or combinations thereof.

The aqueous dispersion of the spheroidal particles is advantageously prepared using a melt emulsification process as described in the Examples section.

When there is just sufficient binder solids present to fill the voids between pigment particles in the dry paint, the paint is said to be at the critical pigment volume concentration (CPVC). The composition of the present invention is advantageously combined with a below-critical PVC paint formulation having an organic extender PVC of from preferably 15, more preferably from 20, more preferably from 30, to 60, more preferably to 55.

PVC is defined by the following formula:

$$PVC = \left[\frac{\text{Vol Pigment} + \text{Extender}}{\text{Vol Pigment} + \text{Extender} + \text{Binder Solids}}\right] \times 100$$

where binder solids refers to the contribution of polymer from the aqueous dispersion of the polymer particles that bind the pigment and extender particles together.

Preferably, the final paint formulation comprises less than 10 PVC, more preferably less than 5 PVC, more preferably less than 2 PVC, more preferably less than 1 PVC of inorganic extender.

Most preferably, the final coating composition is absent of inorganic extender. Accordingly, another aspect of the present invention is a pigmented coating composition comprising an aqueous dispersion of the organic extender particles, binder, pigment, preferably $TiO_2$, and one or more materials selected from the groups consisting of rheology modifiers; dispersants, surfactants; defoamers; preservatives; flow agents; leveling agents; and neutralizing agents. Examples of preferred binders include acrylic, styrene-acrylic, styrene-butadiene, or ethylene-vinyl acetate binders, and vinyl ester binders. Preferably, the pigmented coating composition comprises a substantial absence of inorganic extender and wherein the organic extender has a pigment volume concentration in the paint formulation of from 15 to 60, with the proviso that the PVC of the pigmented coating composition is below critical.

As the following Examples illustrate, the particle size range and spheroidal geometry of the organic extender is critical for achieving the improvement in stain removal performance in coating compositions containing the organic extender.

Examples

Preparation of Aqueous Dispersion of HDPE and PP Particles

The aqueous dispersions were prepared as described in US2012/0238681 A1. For Examples 1-3 and Comparative Example 1, the polyolefin is high density polyethylene (HDPE DMDA 8940NT Resin from The Dow Chemical Company, specific gravity 0.953 g/cm³), the ethylene-acrylic acid copolymer is PRIMACOR™ 5980i Copolymer (a Trademark of The Dow Chemical Company or Its Affiliates) with an acid value of ~156 mg KOH/g of copolymer, and the maleic acid functionalized wax is LICOLUB CE-2 Wax (Clariant) with an acid value of ~85. For Example 4, the polyolefin is INSPIRE™ 137 Performance Polypropylene Polymer (a Trademark of The Dow Chemical Company or Its Affiliates), the ethylene-acrylic acid copolymer is PRIMACOR 5980i Copolymer, and the maleic acid functionalized wax is LICOCENE PP MA 6452 Wax (Clariant) with an acid value of ~41.

The acid groups of the ethylene-acrylic acid copolymer and the wax were neutralized with N,N-dimethylethanolamine (DMEA) at 120 mole percent of theoretical acid functionality based on acrylic acid and maleic anhydride content. The ethylene-acrylic acid copolymer, the maleic acid functionalized wax and the polyolefin were fed into the feed throat of a 25-mm diameter Berstorff ZE25 twin screw extruder by means of a loss-in-weight feeder where the resin was forwarded and melted. The extruder temperature profile was ramped up to approximately 160° C. prior to the addition of premixed initial water and DMEA. Downstream, dilution water was introduced at two locations into the dilution zone of the extruder using two separate pumps. The initial water and first dilution water streams were pre-heated and merged together prior to injection into the extruder. The second dilution was also preheated to 100° C. and injected. A back-pressure regulator at the extruder outlet was used to adjust the pressure to approximately 300 psi (2.1 MPa) inside the extruder barrel to prevent steam formation at the operating temperature. The resulting dispersions were cooled and filtered by gravity through 800-, 200-, and 50-μm nylon mesh bag filters. The viscosity of dispersed samples was measured at room temperature using a Brookfield DV II+ (Model RV) rotational viscometer run at 50 rpm with a spindle that keeps the viscosity in range, typically spindle RV-2 or RV-3.

Table 1 shows the amounts of materials used to prepare the aqueous dispersion of the organic extender particles. Mode particle size refers to the mode particle size of the organic extender particles in microns (μm).

TABLE 1

Makeup of Aqueous Dispersions of Organic Extenders Prepared By Twin Screw Extruder Emulsification

| Example No. | 1 | 2 | 3 | 4 | Comp. 1 |
|---|---|---|---|---|---|
| Polymer/Copolymer/Wax Ratios | 70/20/10 | 72/18/10 | 74/18/8 | 62.5/30/7.5 | 66/20/14 |
| HDPE DMDA 8940NT Resin (g) | 27.8 | 32.4 | 32.2 | 0 | 28.8 |
| INSPIRE PP Resin (g) | 0 | 0 | 0 | 27 | 0 |
| PRIMACOR 5980i Copolymer (g) | 7.9 | 8.1 | 7.8 | 13.0 | 8.7 |
| LICOLUB CE-2 Wax (g) | 4.0 | 4.5 | 3.5 | 0 | 6.1 |
| LICOCENE PP MA 6452 Wax (g) | 0 | 0 | 0 | 3.2 | 0 |
| DMEA (g) | 3.0 | 3.1 | 2.9 | 4.2 | 3.6 |
| Water (g) | 57.3 | 51.9 | 53.6 | 52.6 | 52.8 |
| Mode Particle Size (μm) | 15.0 | 14.7 | 22.0 | 18.0 | 8.5 |
| Viscosity (cP) | 280 | 414 | 194 | N.M. | 1002 |

Table 2 shows the twin-screw extruder conditions under which the dispersions were prepared.

TABLE 2

Twin-Screw Extrusion Processing Conditions

| Example No. | 1 | 2 | 3 | 4 | Comp. 1 |
|---|---|---|---|---|---|
| Total Polymer Feed Rate, g/min | 75.6 | 75.6 | 75.6 | 75.6 | 75.6 |
| Extruder speed (RPM) | 1200 | 1200 | 1200 | 470 | 1200 |
| Resin Blending Zone T, ° C. | 160 | 160 | 160 | 210 | 160 |
| Emulsification zone T, ° C. | 160 | 160 | 160 | 180 | 160 |
| Emulsification zone P, MPa | 2.0 | 2.0 | 1.9 | 1.6 | 2.0 |
| Initial aqueous (IA), mL/min | 30.2 | 30.2 | 30.2 | 24.8 | 30.2 |

Coating Preparation

In the following description and Tables Triton CF-10 refers to Triton CF-10 surfactant, Byk-028 refers to Byk-028 defoamer, ASE-60 refers to ACRYSOL™ ASE-60 Alkali Swellable Emulsion, R-746 refers to Ti-Pure R-746 $TiO_2$ slurry, VSR-50 refers to RHOPLEX™ VSR-50 Polymeric Binder, RM-2020 refers to ACRYSOL™ RM-2020 Rheology Modifier RM-8W refers to ACRYSOL™ RM-8W Rheology Modifier. (ACRYSOL and RHOPLEX are Trademarks of The Dow Chemical Company or Its Affiliates.)

Coatings were prepared using an overhead stirrer. Total volume of each composition was kept constant. Table 3 describes white paint compositions containing different microspheres/non spherical matting agent. The method to prepare a coating is as follows:

In a 0.25-L plastic container, water (1$^{st}$ addition), Triton CF-10 and BYK-028 solutions were mixed by overhead stirring for 1 min. Organic Extender and R-746 were added slowly to the above solution. Stirring speed was adjusted to ensure through mixing. The mixing was continued for 5 min. Next, VSR-50 binder, Texanol coalescent, and ammonia (28% aq.) were added slowly to the mixture and continued mixing for additional 2-3 min. Stirring speed was increased and RM-2020 was added slowly. An increase in viscosity was observed during RM-2020 addition. Next, RM-8W and water (2$^{nd}$ addition) were added under high speed stirring to adjust the viscosity. The mixing was continued for 5 to 10 min. The final mixture was a pigmented, organic extender-containing paint. All paints containing organic extender and $TiO_2$ slurry were prepared following the same procedure.

Paint formulations were prepared using the organic extender particles, including spheroidal organic extenders (Examples 1-3 and Comp. Ex. 1) and non-spherical organic extender particles (Comp. Ex. 2) are show in Table 3. The organic extender used in Comparative Example 2 is Aquamatte 31Wax, which is a powder consisting of irregularly shaped high density polypropylene particles having a mode particle of 11.1 μm.

TABLE 3

Paint Formulation with Organic Extender Particles at 50 PVC

| Example No. | 1 | 2 | 3 | Comp. 1 | Comp. 2 |
|---|---|---|---|---|---|
| PVC | 50 | 50 | 50 | 50 | 50 |
| Water (g) 1$^{st}$ addition | 30.53 | 30.53 | 30.53 | 30.53 | 78.75 |
| Triton CF-10 (g) | 0.84 | 0.84 | 0.84 | 0.84 | 0.84 |
| Byk-028 (g) | 0.10 | 0.10 | 0.10 | 0.10 | 0.10 |
| ASE-60 (g) | 0 | 0 | 0 | 0 | 1.28 |
| Organic Extender (g) | 81.7 | 71.05 | 76.41 | 73.68 | 33.56 |
| R-746 (g) | 42.55 | 42.55 | 42.55 | 42.55 | 42.55 |
| VSR-50 (g) | 63.79 | 63.79 | 63.79 | 63.79 | 63.79 |
| Texanol (g) | 1.45 | 1.45 | 1.45 | 1.45 | 1.45 |
| NH$_3$ (28% aq.) (g) | 0 | 0 | 0 | 0 | 0.17 |
| RM-2020 (g) | 2.71 | 2.71 | 2.71 | 2.71 | 2.71 |
| RM-8W (g) | 9.84 | 9.16 | 9.00 | 9.84 | 4.06 |
| Water (g) 2$^{nd}$ addition | 1.65 | 12.47 | 7.90 | 9.41 | 6.86 |

Test Methods

Particle size measurements—Light diffraction size measurements were done on the samples using a Malvern Mastersizer 2000 Particle Size Analyzer with a 2000 μP sample handling module. The sample handling module was stirred at 1100 RPM. All samples were calculated using a Mie scattering algorithm using best literature estimates for the appropriate particle refractive indices. Red light obscurations were targeted at 6 to 9%. Samples supplied as dispersions were pre-diluted in diluents (~300 mg solid in 5 mL diluents) and then sampled into the instrument dilution tank. The composition of the diluents was borax (15 g), deionized water (1500 g), and Triton X-405 nonionic surfactant (15 g, 70% active). Samples supplied as powders were pre-diluted at the same diluent levels as the dispersions, but these pre-dilutions were given 120 s of ultrasonication in a cleaning bath prior to sub-sampling them into the instrument dilution tank. For Aquamatte 31 wax, a small amount of isopropanol was used before prewetting the powder prior to adding the diluents.

The viscosities of the aqueous dispersion of organic extender particle samples were measured at room temperature using a Brookfield DV II+ rotational viscometer (Model RV) at 50 rpm and a spindle at RV-2. Percent solids were measured using an Ohaus Model MB-50 infrared solids analyzer.

Gloss was measured by the following procedure: Drawdowns of the coatings were prepared at 25° C. and 50% relative humidity (RH) using a 3-mil bird applicator over black and white Leneta chart. The coatings were dried for 24 h at 25° C. and 50% RH before performing gloss measurements. ASTM D-523 method was followed to measure gloss values using a BYK Micro-Tri-gloss meter. Reported gloss values of coatings were obtained from white part of Leneta chart.

Stain removal was measured by the following procedure: Single drawdown of each coating was made on a Leneta Black Vinyl chart with a 7-mil Dow applicator and then dried for 7 days at 25° C. and 50% RH. After the drying period, each stain was applied uniformly to fill in a separate test strip on the chart. After application, the stains were allowed to stand for 2 h and excess stain was removed with a paper towel. A sponge and Leneta non-abrasive scrub medium (10 g+15 g water) was used with a Gardco scrubbability tester and 1245-g weighted abrasion boat to clean the panel. Each panel was scrubbed for 100 cycles, rinsed thoroughly in clean tap water, and allowed to air dry. The dried panels were then rated in a scale of 0 to 10 for removal of each stain. Rating of 0 means the color was similar to the applied stain on the unclean section of panel. A rating of 10 indicates the stain was completely removed. Table 4 illustrates the stain removal capability of the tested coating.

TABLE 4

Stain Removal Results

| Example No. | Gloss 85° | Mode Particle Size (μm) | #2 Pencil Stain Rating |
|---|---|---|---|
| 1 | 2.3 | 15.0 | 8 |
| 2 | 1.7 | 14.7 | 6 |
| 3 | 1.0 | 22.0 | 7 |
| Comp. 1 | 5.8 | 8.5 | 4 |
| Comp. 2 | 1.5 | 11.1 | 2 |

The results demonstrate the superior stain removal properties of paint formulations with organic extenders having both high particle size (>10 μm) and spheroidal shape. Although it is not surprising that gloss reduction is observed for compositions containing larger spheroidal particles, it is surprising that stain removal is improved. Moreover, although not bound by theory, it is believed that spheroidal particles are advantaged over irregularly shaped particles for stain resistance because spheroidal particles provide a more uniform packing density within the coating and present a non-oriented and uniform topography at the surface of the coating; in contrast, irregularly shaped particles create islands of defects that adversely affect stain removal.

The invention claimed is:

1. A composition comprising an aqueous dispersion of spheroidal particles having a mode particle size of from 10 to 30 μm, wherein the particles comprise a) from 53 to 85 weight percent of a polyolefin; and b) from 5 to 40 weight percent of a coupling agent which is a maleic anhydride functionalized polyolefin having an acid number in the range of from 35 to 220, wherein the weight percentages are based on the total weight of the polyolefin and the coupling agent;

with the proviso that when the coupling agent has an acid number of less than 100, the composition further comprises from 9 to 35 weight percent of an ethylene-acrylic acid copolymer, based on the total weight of the polyolefin, the coupling agent, and the ethylene-acrylic acid copolymer, wherein the ethylene-acrylic acid copolymer has an acid number in the range of from 20 to 220.

2. The composition of claim 1, wherein the coupling agent has an acid number in the range of 35 to 99, the spheroidal particles comprise from 57 to 78 weight percent of the polyolefin, based on the weight of the polyolefin, the coupling agent, and the ethylene-acrylic copolymer; wherein the polyolefin is polyethylene, polypropylene, a copolymer of polyethylene, a copolymer of polypropylene, or an ethylene-vinyl acetate copolymer, or a combination thereof.

3. The composition of claim 2, wherein the ethylene-acrylic acid copolymer has an acid number in the range of from 120 to 200 and a concentration in the range of from 15 to 32, based on the weight of the polyolefin, the coupling agent, and the ethylene-acrylic copolymer.

4. The composition of claim 3, wherein the coupling agent has an acid number in the range of from 40 to 90 and a concentration of from 7 to 11 weight percent based on the weight of the polyolefin, the coupling agent, and the ethylene-acrylic copolymer, wherein the spheroidal particles having a mode particle size of from 12 to 25 μm.

5. The composition of claim 2, wherein the polyolefin is polypropylene or a high density polyethylene.

6. A composition comprising an aqueous dispersion of spheroidal particles having a mode particle size of from 12 to 25 μm, wherein the particles comprise a) from 57 to 75 weight percent of polypropylene or a high density polyethylene; b) from 15 to 32 weight percent of an ethylene-acrylic acid copolymer having an acid number in the range of 140 to 180 and c) from 7 to 11 weight percent of a coupling agent which is a maleic anhydride functionalized polyolefin having an acid number in the range of from 40 to 90; wherein the weight percentages are based on the total weight of the polyolefin, the ethylene-acrylic copolymer, and the coupling agent.

7. The composition of claim 1, which is a pigmented coating composition that further comprises a pigment, a binder, and one or more materials selected from the group consisting of rheology modifiers; dispersants, surfactants; defoamers; preservatives; flow agents; leveling agents; and neutralizing agents.

8. The composition of claim 7, wherein the pigment is $TiO_2$, the binder is an acrylic, a styrene-acrylic, or a vinyl ester binder, wherein the pigmented coating composition is a below-critical PVC composition that comprises less than 10 PVC of an inorganic extender, wherein the PVC of the spheroidal particles is from 15 to 60.

9. The composition of claim 8, wherein the PVC of the spheroidal particles is from 20 to 55, wherein the compositions comprises less than 1 PVC of the inorganic extender.

10. The composition of claim 6, which is a pigmented coating composition that further comprises $TiO_2$, an acrylic, a styrene-acrylic, or a vinyl ester binder, a rheology modifier, a dispersant, a surfactant, and a defoamer, and a neutralizing agent, wherein the coating composition is a below-critical PVC composition that comprises less than 10 PVC of an inorganic extender, wherein the PVC of the spheroidal particles is from 20 to 55.

* * * * *